July 1, 1930. R. L. SIM 1,768,999
TIRE ALARM
Filed Dec. 2, 1929
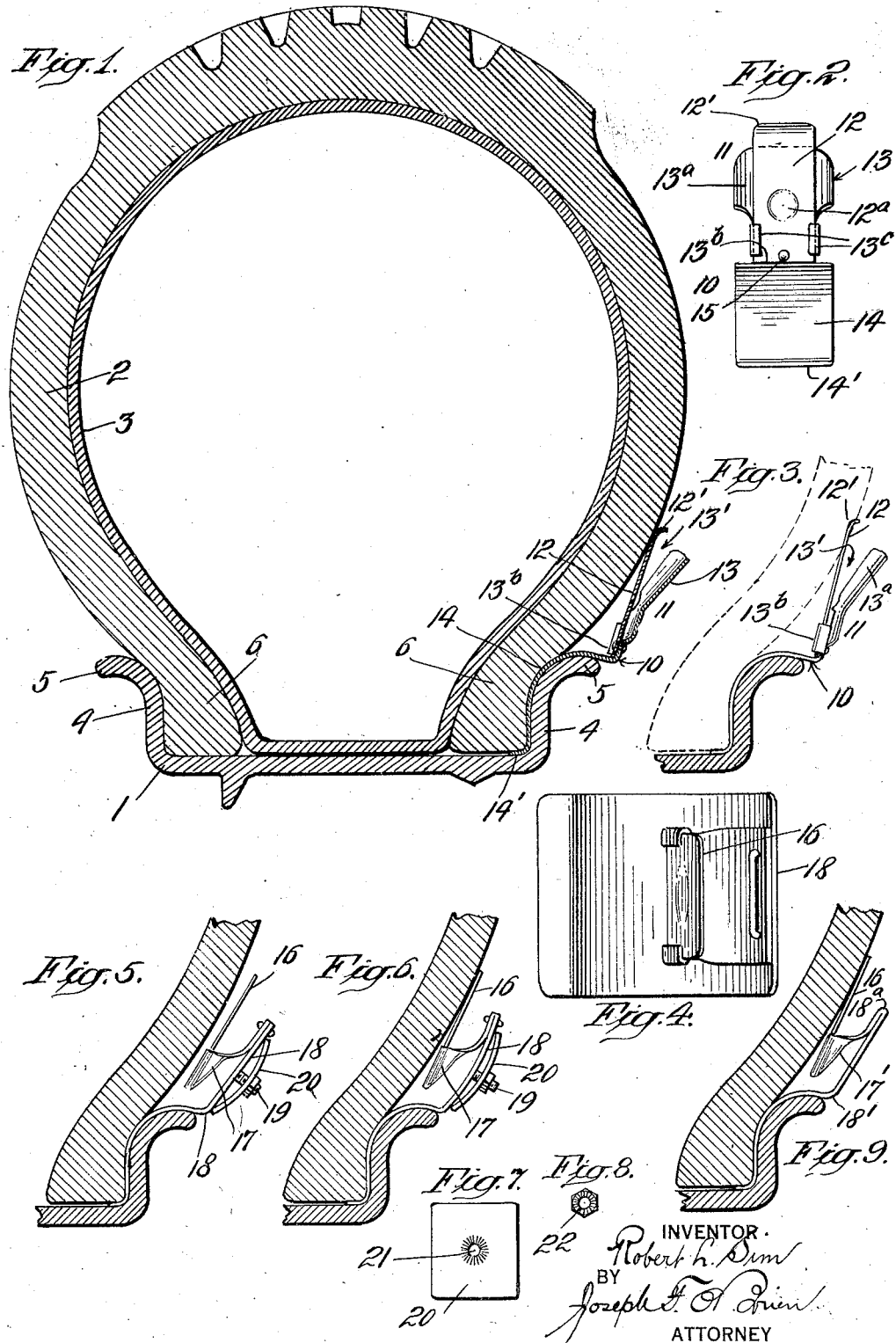

Patented July 1, 1930

1,768,999

UNITED STATES PATENT OFFICE

ROBERT L. SIM, OF NEW YORK, N. Y.

TIRE ALARM

Application filed December 2, 1929. Serial No. 410,929.

This invention relates to improvements in tire-alarms.

One of the objects of my invention is to produce a simple, small and compact alarm device which will produce, during rotation of the tire, a plurality or series of successive sounds of sufficient volume to provide an effective signal for indicating to the driver of the automobile that the tire to which the device is attached is "flat" or partially deflated, and which will be capable of being readily and quickly mounted within the junction or corner formed between the outwardly-projecting lip of the flange of the rim and the base portion of the tire on the inner side of the tire.

Still another object of my invention is to provide a device having a sound-amplifying housing formed in one piece with a supporting element capable of being clamped between the tire and the rim-flange and arranged to cause the sound-amplifying housing to project outwardly from the lip of such rim-flange in a plane substantially parallel with the surface of the tire and the sound-producing element to be mounted in the housing and to extend from the bottom of the housing to the surface of the tire in a plane substantially inclined to the housing and tangential to said tire surface whereby the entire device will be arranged closely adjacent to the base of the tire so as to be out of the way and at the same time to enable the production of a sound of sufficient volume to positively reach the automobile driver.

Still another object of my invention is to provide a device which is capable of screw adjustment to move the sound-producing element toward and away from the tire and thus to adjust the same in proper relative position of the tire.

Another object of my invention is to provide a construction in which the sound-amplifying housing will be so positioned in relation to the sound-producing element and the tire and will be of such relative flexibility and resilience that the sound-producing qualities of the device may initially be tested while it is in place on the tire by an inward pressure on the housing.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a section of an automobile rim and tire showing in longitudinal section my tire-alarm device applied to said tire;

Fig. 2 is a rear elevation of the tire-alarm device shown in Fig. 1 removed from the tire;

Fig. 3 is a fragmentary section of a tire and rim showing in side elevation the application of the device to the rim before the tire is inflated;

Fig. 4 is a top or plan view of a modified form of device shown in Figs. 4 and 5;

Fig. 5 is a fragmentary section showing, in end elevation, the modified form of my device illustrated in Fig. 4 and applied, before adjustment, to a tire-rim;

Fig. 6 is a similar view of the device shown in Figs. 4 and 5 after adjustment thereof;

Fig. 7 is a side elevation of the adjusting member shown in Figs. 5 and 6;

Fig. 8 is a view of the adjusting nut employed with the adjustment plate shown in Fig. 7; and Fig. 9 is a fragmentary section showing, in end elevation, another modified form of my device applied to the rim of a tire.

Referring now to these drawings, which illustrate a preferred embodiment of my invention, 1 indicates the metallic rim of a pneumatic automobile tire comprising a shoe 2 and air tube 3. In a large majority of automobile tires, the rim 1 is provided on opposite sides with flanges 4 having lips 5 and the tire shoe 2 is provided with base portions 6 which fit within the rim and, when the tire is inflated, the shoe 2 is held in place and the base portions are forced, under pressure, against the opposite flanges 4 of the rim 1. When a slow leak occurs in a tire, contact, during rotation, of the tread portion with the ground will cause outward or sidewise spreading of the tire and at any given place along the periphery of the tire, there will occur successive spreadings and contractions as that portion contacts with the ground and moves away from the ground. The spreading and contracting movable portion of the tire under such circumstances has its fulcrum at the outer edge or lips 5 of the rim-flange 4.

It is desirable in alarm devices of the type under consideration to first provide a device which will be as small as possible; secondly, to provide a device which may be readily, quickly and securely mounted upon the rim or wheel in such relative position to the tire as to cause a positive operation thereof so soon as a leaky tire becomes slightly or somewhat deflated and, thirdly, to provide a device which will furnish an alarm or signal of such volume or magnitude as to positively and effectively notify the driver or operator that the tire is leaking or is partially flat before the same reaches a condition in which the tire will be damaged or in which the operation of the car will be endangered.

It is also desirable to provide a construction in which the sound-amplifying housing will be so positioned in relation to the sound-producing element and the tire and will be of such relative flexibility and resilience that the sound producing qualities of the device may initially be tested while it is in place on the tire by an inward pressure of the housing.

In accordance with my invention, I provide a tire-alarm 10 which comprises an alarm or sound producing element and a mounting member therefor. The sound-producing element is preferably positioned at the fulcrum portion of the tire above mentioned and is arranged to fit within or closely adjacent to the corner formed between the external surface of the tire and the lip of the rim-flange. As illustrated, a sound-producing element 11 comprising a resilient metallic tongue 12, is so mounted as aforesaid in a housing 13 also formed of metal which though relatively rigid in relation to the tongue is capable of flexing relatively to the said tongue in order to enable an initial testing of the device in applied position. Said housing preferably extends in a plane spaced from and substantially parallel to the surface of the tire and the said tongue 12 extends in a plane substantially tangential to the periphery of the tire, viz., said tongue has its projecting end 12' maintained in contact with the periphery of the tire and its body portion extending toward the lip of the rim-flange and its opposite end terminating in the housing 13 closely adjacent to said lip. This metallic tongue is provided with a conventional sound-producing depression 12ª and is so mounted in the sound-reinforcing housing 13 and so arranged in relationship to the tongue to provide a sound chamber 13'. The said housing 13 is preferably formed in one piece with a mounting bracket 14 which is insertable between the tire and the rim and this provides a secure mounting for the device. As illustrated, the bracket portion conforms in curvature with the flange of the rim and has a terminal portion 14' fitting beneath the tire so that when the tire is inflated the device will be securely mounted at the junction of the tire and the rim-flange. The integral housing 13 has a rounded stamped-up body portion 13ª, a tongue-stop portion 13ᵇ and integral lugs 13ᶜ which form a seat for the tongue adjacent to the sound chamber or cavity 13' which is formed by stamping-up the body portion 13ª. In the preferred form of my invention shown, a rivet 15 is employed to fasten the end of the tongue and housing together at the said tongue-stop portion 13ᵇ.

It will thus be seen that I have produced a simple, small and compact device of the type hereinabove specified which will be capable of being readily and quickly mounted within the junction or corner formed between the outwardly-projecting lip of the flange of the rim and the base portion of the tire on the inner side of the tire and have also provided a device having a sound-amplifying housing formed in one piece with a supporting element capable of being clamped between the tire and the rim-flange and arranged to cause the sound-amplifying housing to extend outwardly from the lip of such rim-flange in a plane substantially parallel with the surface of the tire whereby the entire device will be arranged closely adjacent to the base of the tire so as to be out of the way and at the same time to enable the production of a sound of sufficient volume to positively reach the automobile driver.

Also that I have provided a construction in which the sound-amplifying housing will be so positioned in relation to the sound-producing element and the tire and will be of such relative flexibility and resilience that the sound-producing qualities of the device may intially be tested while it is in place on the tire by an inward pressure on the housing.

In Figs. 4 to 8 I have shown a modified form of my invention in which the tongue and housing may be adjusted in relation to the tire. In these figures, 16 indicates a sound-producing tongue, 17 a sound-amplifying housing secured at its upper end to a mounting bracket 18. The bracket has mounted on its outer surface a screw 19 and an adjusting plate 20 of rigid material has a hole 21 for mounting on the screw 19. The plate is curved and has its periphery resting on the housing while the screw projects centrally therethrough. A nut 22 is mounted on the screw and is adapted to apply pressure between the bracket 18 which carries the housing 17 and the plate. The plate is roughened adjacent to the screw hole to enable the nut to be held in position when tightened. Tightening of the nut will enable the housing to be adjusted toward the tire and in this manner the tongue may be adjusted toward and away from the periphery of the tire. In other respects, this construction is similar to that hereinabove described.

In Fig. 9 I have shown another modified form in which the tongue 16' is mounted in a housing 17' and bracket 18', the parts being arranged substantially as shown in Figs. 4 to 6, except that the adjusting screw and plate are omitted and the said housing and bracket are formed in one piece and bent at 18ª.

The operation of the devices shown in Figs. 5 to 9 and the initial testing thereof is accomplished in the same manner as hereinabove stated and need not be further described.

I claim:

1. A tire alarm embodying in combination a mounting bracket having a mounting part insertable between a tire and a tire-mounting rim flange, a sound-amplifying housing connected with said bracket and extending in spaced and substantially parallel relationship to that portion of the tire adjacent to the rim, and a resilient sound-producing metallic tongue mounted at one end in said housing and having its opposite end free and extending in a direction inclined to said housing and substantially tangential to the surface of the tire.

2. A tire-alarm embodying in combination a mounting bracket having a mounting part insertable between a tire and a tire-mounting rim-flange, a sound-amplifying housing connected with said bracket and extending in spaced and substantially parallel relationship to that portion of the tire adjacent to the rim, and a resilient sound-producing metallic tongue mounted at one end in said housing and having its opposite end free and extending in a direction inclined to said housing and substantially tangential to the surface of the tire, said mounting bracket and sound-amplifying housing being formed in one piece.

3. A tire-alarm embodying in combination a mounting bracket having a mounting part insertable between the tire and a tire-mounting rim-flange, a sound-amplifying housing connected with said bracket and extending in spaced and substantially parallel relationship to that portion of the tire adjacent to the rim, and a resilient sound-producing metallic tongue mounted at one end in said housing and having its opposite end free and extending in a direction inclined to said housing and substantially tangential to the surface of the tire, said housing being formed of a flexible metal and being so arranged that the housing may be flexed relatively to said tongue to enable a testing of the device when attached in place.

4. A tire alarm embodying in combination, a mounting bracket having a mounting part insertable between a tire and a tire-mounting rim-flange, a sound-amplifying housing connected with said bracket and extending in spaced and substantially parallel relationship to that portion of the tire adjacent to the rim, and resilient sound-producing metallic tongue mounted at one end in said housing and having its opposite end free and extending in a direction inclined to said housing and substantially tangential to the surface of the tire and means for adjusting the position of the housing and tongue in relation to the tire.

In witness whereof, I have signed my name to the foregoing specification.

ROBERT L. SIM.